United States Patent
Yeager et al.

(10) Patent No.: US 7,638,053 B2
(45) Date of Patent: Dec. 29, 2009

(54) POLY(METH)ACRYLATE MEMBRANES FOR SEPARATION OF HYDROCARBON MIXTURES

(75) Inventors: Gary William Yeager, Rexford, NY (US); Sharon Oba, Clifton Park, NY (US); Christopher J. Ellison, Blue Bell, PA (US)

(73) Assignee: General Electric Company, Niskayuna, NY (US)

( * ) Notice: Subject to any disclaimer, the term of this patent is extended or adjusted under 35 U.S.C. 154(b) by 932 days.

(21) Appl. No.: 11/158,851

(22) Filed: Jun. 22, 2005

(65) Prior Publication Data

US 2006/0289352 A1    Dec. 28, 2006

(51) Int. Cl.
B01D 29/00 (2006.01)
B01D 29/14 (2006.01)
B29C 65/00 (2006.01)

(52) U.S. Cl. .................. 210/500.35; 210/500.27; 264/41

(58) Field of Classification Search ............ 210/500.27, 210/500.35, 500.37, 500.38, 500.42, 500.23, 210/500.34; 95/45; 96/4–11
See application file for complete search history.

(56) References Cited

U.S. PATENT DOCUMENTS

| | | | |
|---|---|---|---|
| 4,115,465 A | 9/1978 | Elfert et al. | |
| 4,116,936 A | 9/1978 | Steiner | |
| 4,728,429 A * | 3/1988 | Cabasso et al. | 210/638 |
| 4,828,773 A | 5/1989 | Feimer et al. | |
| 4,861,823 A | 8/1989 | Qureshi | |
| 4,944,880 A | 7/1990 | Ho et al. | |
| 4,946,594 A | 8/1990 | Thaler et al. | |
| 5,093,003 A | 3/1992 | Ho et al. | |
| 5,128,428 A | 7/1992 | Shinohara et al. | |
| 5,128,439 A | 7/1992 | Sartori et al. | |
| 5,138,023 A | 8/1992 | Sartori et al. | |
| 5,147,937 A * | 9/1992 | Frazza et al. | 525/243 |
| 5,177,296 A | 1/1993 | Sartori et al. | |
| 5,180,496 A | 1/1993 | Sartori et al. | |
| 5,236,588 A * | 8/1993 | Zhang et al. | 210/500.35 |
| 5,342,554 A * | 8/1994 | McBain et al. | 523/466 |
| 5,596,817 A | 1/1997 | Hansen | |
| 5,643,442 A * | 7/1997 | Sweet et al. | 208/302 |
| 5,750,129 A * | 5/1998 | Wakarchuk | 424/408 |
| 6,319,404 B1 * | 11/2001 | Zhang et al. | 210/500.29 |
| 6,562,181 B2 * | 5/2003 | Righettini | 156/331.6 |
| 6,627,704 B2 * | 9/2003 | Yeager et al. | 525/391 |
| 6,803,445 B2 | 10/2004 | Ishikawa et al. | |
| 7,422,879 B2 * | 9/2008 | Gebhard et al. | 435/182 |
| 7,476,636 B2 * | 1/2009 | Kulkarni et al. | 502/60 |

* cited by examiner

*Primary Examiner*—Ana M Fortuna
(74) *Attorney, Agent, or Firm*—Mary Louise Gioeni (57) ABSTRACT

The separation of hydrocarbon mixtures comprising a polymerizable vinyl containing polyester of the formula I:

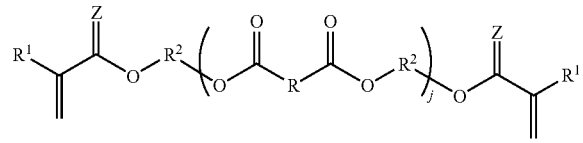

I

Each R and $R^2$ is independently a $C_6$-$C_{20}$ aromatic residue or a $C_1$-$C_{20}$ aliphatic residue. Each $R^1$ is independently hydrogen or $C_1$-$C_5$ alkyl; "j" is an integer in the range of 1-1000. Z is a heteroatom or two hydrogen atoms. The invention is also directed to the method of preparing the separation membrane.

17 Claims, 1 Drawing Sheet

FIG 1

POLY(METH)ACRYLATE MEMBRANES FOR SEPARATION OF HYDROCARBON MIXTURES

FIELD OF THE INVENTION

This invention relates generally to oligomeric polyester poly(meth)acrylate membranes for the separation of aromatic and aliphatic hydrocarbons.

BACKGROUND OF THE INVENTION

The petroleum industry is the largest consumer of energy in the nation, using 6.4 quadrillion BTU's in 1994. See Manufacturing Energy Consumption Survey 1994 (MECS) Energy Information Administration, U.S. Dept. of Energy, available at the URL "eia.doe/gov.emeu/mecs/mecs94/consumption/mecs5.html" Distillation operations constitute some 35-40% of the energy utilized, while hydrodesulfuration accounts for another 18%. The need for reducing energy costs to provide a more globally competitive industry while meeting environmental legislation has led companies to devise new strategies to achieve these goals. See Cumulative Impact of Environmental Regulations on the U.S. Petroleum Refining, Transportation and Marketing industries, American Petroleum Institute, October 1997.

Membrane pervaporation technology holds promise to significantly decrease petrochemical energy consumption. Pervaporation is characterized by imposition of a barrier membrane between a liquid and a gaseous phase, with mass transfer occurring selectively across the barrier to the gas side. Because of the unique phenomenon of phase change required of the liquids across the barrier, the process is termed pervaporation. Thus pervaporation membranes separate molecules on the basis of molecular interactions with the polymer in the membrane. This type of separation does not require intensive heat energy that is usually associated with distillation, since often a vacuum is applied to the gas side as a driving force. By having polymers with a specifically tailored architecture, these membranes may enable otherwise difficult separations and create opportunities for new separation techniques. Pervaporation membranes, either alone or in hybrid configurations with distillation or extraction, may provide optimal processes and additional latitude for their implementation. See R. Rautenbach and R. Albrecht, The Separation Potential of Pervaporation Part 2, Process Design and Economics, 25 J. Membrane Sci. 25-54 (1985).

However, commercial use of membranes in non-aqueous environments, such as those of petrochemical feedstreams, has only recently been realized. See G. Krishnaiah and J. Balko, *Ultra-low Sulfur Gasoline ComplianceCosts with Davison Clean Fuels Technologies*, Presentation at the National Petrochemical & Refiners Association Annual Meeting, San Antonio, Tex. (March 2003). The inability of pervaporation membranes to withstand long-term exposure to the moderately high temperatures has been an important issue. Excessive swelling, and chemical and temperature instability, have led to selectivity losses and failure. The need for a robust membrane material capable of withstanding exposure to organic liquids has been identified as a primary obstacle to the implementation of membrane technology.

The use of membranes to separate aromatic hydrocarbons from aliphatic hydrocarbons is generally known in the scientific and industrial community. For example, U.S. Pat. No. 4,115,465 teaches the use of polyurethane membranes to selectively separate aromatics from saturated hydrocarbons by pervaporation. U.S. Pat. No. 4,944,880 teaches the use of polyurethane-aliphatic polyester and polyamide-aliphatic polyester copolymers for the separation of aromatic and aliphatic mixtures. U.S. Pat. No.4,946,594 describes membranes for the separation of aromatic and aliphatic mixtures produced from reaction of an aliphatic polyester diol with a dianhydride and a diisocyanate. U.S. Pat. No. 5,128,439 describes the synthesis of high molecular weight saturated polyesters, and U.S. Pat. No. 5,177,296 describes a method for separating aromatic from aliphatic hydrocarbons using these polyesters. U.S. Pat. No. 5,138,023 describes a method for the synthesis of unsaturated polyesters, and U.S. Pat. No. 5,180,496 describes a method for separating aromatic from aliphatics using these polyesters. U.S. Pat. No. 4,828,773 describes polyurea/urethane membranes containing aliphatic polyester blocks for the separation of aromatic and aliphatic mixtures. U.S. Pat. No. 5,093,003 describes polyester-polyurethane block copolymers for aromatic aliphatic separations.

It would therefore be desirable for a more stable membrane for the separation of mixtures of aromatic and aliphatic organic.

SUMMARY

Briefly, in accordance with embodiments of the invention, a separation membrane for hydrocarbon mixtures comprising a polymerizable composition comprising a vinyl containing polyester and a free radical initiator. The polymerizable vinyl containing polyester has a structure of the formula I:

Each R and $R^2$ is independently a $C_6$-$C_{20}$ aromatic residue or a $C_1$-$C_{20}$ aliphatic residue. Each $R^1$ is independently hydrogen or $C_1$-$C_5$ alkyl; and "j" is an integer in the range of 2-1000, preferably 5-500, and more preferably 10-100, and Z is a heteroatom or two hydrogen atoms, preferably oxygen, sulfur or two hydrogen atoms.

In accordance to a different embodiment of the invention, a separation membrane for hydrocarbon mixtures comprises a polymerizable composition comprising a polyvinyl containing polyester of the formula II:

Each R and $R^2$ is independently a $C_6$-$C_{20}$ aromatic residue or a $C_1$-$C_{20}$ aliphatic residue. Each $R^1$ is independently hydrogen or $C_1$-$C_5$ alkyl; "n" is an integer between 2 and 100,000, preferably greater than 5 and most preferably greater than 10;and "j" is an integer in the range of 1-20.Z is a heteroatom, or two hydrogen atoms, preferably oxygen, sulfur, or two hydrogen atoms.

In accordance with a different embodiment, the invention is directed to a polymerizable composition comprising a vinyl group containing polyester of the formula III:

III

Each R and $R^2$ is independently a $C_6$-$C_{20}$ aromatic residue or a $C_1$-$C_{20}$ aliphatic residue. Each $R^1$ is independently hydrogen or $C_1$-$C_5$ alkyl; and "s" is an integer in the range of 2-1000, preferably 5-500, and more preferably 10-100, "t" is an integer between 1 and 10 preferably between 1 and 5 and most preferably between 1 and 2, preferably greater than 5 and most preferably greater than 10. Z is a heteroatom, or two hydrogen atoms, preferably oxygen, sulfur or two hydrogen atoms.

BRIEF DESCRIPTION OF THE DRAWING

These and other features, aspects, and advantages of the present invention will become better understood when the following detailed description is read with reference to the accompanying drawing in which like characters represent like parts throughout the drawing, wherein.

DETAILED DESCRIPTION OF EXEMPLARY EMBODIMENTS

This invention is related to separation membranes derived from a polymerizable vinyl containing polyester composition, comprising a vinyl containing polyester and a free radical initiator.

This invention is also related to a method of making membranes with polymerizable vinyl group containing polyester compositions, and the use of these membranes in the separation of mixtures of aromatic and aliphatic solvents.

Oligomeric polymerizable vinyl group containing polyesters such as polyester poly(meth)acrylates can be polymerized to make membrane materials for the separation of hydrocarbon mixtures such as aromatic and aliphatic hydrocarbons. The polymerizable polyester (meth)acrylates can be represented by the formula I, and the corresponding polymerized polyester poly(meth)acrylates by the formula IV:

I

↓ Radical or Cationic Initiator

IV

Each R and $R^2$ is independently a $C_6$-$C_{20}$ aromatic residue or a $C_1$-$C_{20}$ aliphatic residue. Each $R^1$ is independently hydrogen or $C_1$-$C_5$ alkyl; and "j" is an integer in the range of 2-1000, preferably 5-500, and more preferably 10-100. Z is a heteroatom or two hydrogen atoms, preferably oxygen, sulfur or two hydrogen atoms.

Each R, $R^1$ and $R^2$ is independently attached to substituents(s) $(X)_a$, wherein each X is independently amine, imide, amide, oxime, cyano, isonitrile, nitrate, hydrazide, nitrogen-containing heterocycle, carboxylic acid or corresponding metal salt, ether, formyl, carbonate, carboxylic acid ester, carbinol, phosphorus, phosphate, phosphinate, phosphonate, phosphine oxide, phosphinic acid, phosphonic acid, or corresponding metal salt, sulfone, suolfoxide, thioether, disulfide, sulfinic acid, sulfonic acid or corresponding metal salt, siloxane, fluorine, chlorine, bromine and the like. The "a" is an integer in the range of 0 to 20.

In one preferred embodiment, each R and $R^2$ is independently a $C_6$-$C_{12}$ aromatic or a $C_1$-$C_{12}$ aliphatic residue, and each $R^1$ can be H or methyl.

In an exemplary embodiment, R and $R^2$ is independently a $C_6$-$C_{12}$ aromatic residue or a $C_1$-$C_{12}$ aliphatic residue of the bisphenol $R(OH)_k$, wherein "k" is an integer in the range of 2-4. In a more preferred embodiment, R and $R^2$ can be 2,2-bis-(4-hydroxyphenyl)propane (or bisphenol-A); bis-(2,4-dihydroxyphenyl)methane; bis-(2-hydroxyphenyl)methane; bis-(4-hydroxyphenyl)methane; bis-(4-hydroxy-5-nitrophenyl)methane; bis-(4-hydroxy-2,6-dimethyl-3-methoxyphenyl)methane; 1,1-bis-(4-hydroxyphenyl)ethane; 1,2-bis-(4-hydroxyphenyl)ethane; 1,1-bis-(4-hydroxy-2-chlorophenyl)ethane; 1,1-bis-(2,5-dimethyl-4-hydroxyphenyl)ethane; 1,3-bis-(3-methyl-4-hydroxyphenyl)propane; 2,2-bis-(3-phenyl-4-hydroxyphenyl)propane; 2,2-bis-(3-isopropyl-4-hydroxyphenyl)propane; 2,2-bis-(4-hydroxyphenyl)propane; 2,2-bis-(4-hydroxyphenyl)pentane; 3,3-bis-(4-hydroxyphenyl)pentane; 2,2-bis-(4-hydroxyphenyl)heptane; bis-(4-hydroxyphenyl)phenylmethane; bis-(4-hydroxyphenyl)cyclohexymethane; 1,2-bis-(4-hydroxyphenyl)-1,2-bis-(phenyl)propane; 2,2-bis-(4-hydroxyphenyl)-1-phenylpropane, 2,2-bis(2,6-dibromophenoxy-4-hydroxyphenyl)propane, tris(4-hydroxyphenyl)ethane, 2,2-bis-(4-(2-oxy-1-hydroxyethyl)phenyl)propane, 2,2-bis-(2,6-dibromo-4-(2-oxy-1-hydroxyethyl)phenyl)propane, 2,2-bis-(4-(3-oxy-2-hydroxypropyl)phenyl)propane; 2,2-bis-(2,6-dibromo-4-(3-oxy-2-hydroxypropyl)phenyl)propane, 2,2-dimethyl-1,3-propanediol, 1,4-butanediol, 1,1-cyclohexanedimethanol, 1,2-ethandiol, or 2,2,2-tris-(hydroxymethyl)propane. Also included are materials derived from the reaction of an epoxy compound and (meth)acrylic acid such as vinyl ester resins produced by the reaction of the diglycidyl ether of bisphenol-A and methacrylic acid. They include 2,2-bis(4-(3-oxy-2-hydroxypropoxy)phenyl)propane; and 2,2-bis(2,6-dibromo-4-(3-oxy-2-hydroxy propoxy)phenyl)propane. Such materials are sold under the Tradename Derakane® resins by Dow Chemical Company.

In a more preferred embodiment, each R and $R^2$ is independently a residuum of a member or members selected from the group consisting of isophthalic acid, terephthalic acid, oxalic acid, malonic acid, succinic acid, adipic acid, oxydiglycolic acid, oxydipropionic acid, thiodiglycolic acid, thiodipropionic acid, sulfonyldiglycolic acid, and sulfonyldipropionic acid. The "j" is an integer in the range of 2-1000, preferably 5-500, and more preferably 10-100.

The polyester poly(meth)acrylate is made from a polyester diol having a molecular weight of about 100 to about 500,000, preferably about 750 to about 10,000, more preferably about 1,000 to about 4,000, and most preferably about 1,000 to about 3,000.

Numerous types of acrylates substituted with various $R^1$ groups are useful in this invention, and the preferred acrylates are methacrylate, when $R^1$ is methyl, and acrylate, when $R^1$ is hydrogen. The term "(meth)acrylate" refers to both "methacrylate" (when $R^1$ is methyl) and "acrylate" (when $R^1$ is hydrogen) residues.

Examples of preferred polyester (meth)acrylates of this embodiment include, but are not limited to, polyethylene terephthalate dimethacrylate, and polyethylene adipate dimethacrylate, polyethylene succinate dimethacrylate, polyethylene thiodipropionate, polyethylene thiodiglycolate, polyethylene oxydiglycolate or mixtures thereof.

The polymerizable composition further comprises free radical initiator. Suitable initiators of the radical polymerization are either peroxide initiators, or non-peroxide inititors. Peroxide initiators include organic peroxides and inorganic peroxides. Non-peroxide initiators include azo compounds, carbon-carbon initiators, and UV initiators.

Representative examples of organic peroxide initiators include, but are not limited to, benzoyl peroxide, cumene hydroperoxide, 2,5-dimethyl-hexane-2,5-dihydroperoxide, 2,5-dimethyl-2,5-di(t-butylperoxy)hexyne-3, di-t-butyl peroxide, t-butylcumyl peroxide, α,α'-bis(t-butylperoxy-m-isopropyl) benzene, 2,5-dimethyl-2,5-di(t-butylperoxy)hexane, dicumyl peroxide, di-t-butylperoxy isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide and trimethylsilyltriphenylsilyl peroxide and the like, such as those described in U.S. Pat. No. 6,673,892 (the '892 patent), which is incorporated by reference in its entirety. Representatives of inorganic peroxides include, but are not limited to, hydrogen peroxide, potassium peroxydisulfate and the like.

Representative examples of azo compounds include, but are not limited to, 2,2'-azobis(4-methoxy-2,4-dimethylpentanenitrile), 2,3'-azobis(2,4-dimethylpentanenitrile), 2,2'-azobis(isobutyronitrile) and the like. Representative carbon-carbon initiators include, but are not limited to, 2,3-dimethyl-2,3-diphenylbutane, 3,4-dimethyl-3,4-diphenylhexane. Representative UV initiators include, but are not limited to, benzophenone, 4-phenylbenzophenone, xanthone, thioxanthone, 2-chlorothioxanthone, 4,4'-bis(dimethylamino)benzophenone, benzyl, 9,10-phenanthraquinone, 9,10-anthraquinone, diphenyl(2,4,6-trimethylbenzoyl)phosphine oxide, and the like. Additional examples of UV initiators may be found in the '892 patent.

The amount of the initiator used in the various embodiments of the invention is preferably from about 0.1 to about 10 parts by weight, more preferably from about 0.1 to about 8 parts by weight and, most preferably about 1 to about 2 parts by weight.

Also, the polymerizable composition may further comprise a vinyl copolymer selected from the group consisting of styrenic, acrylic, methacrylic, acrylamide, methacrylamide, vinylether, vinylester, vinylbenzyl ether, bismaleimide isocyanate monomers and combinations thereof.

In general, a polyester (meth)acrylate (I) is prepared from the reaction of (methyl)acryloyl chloride or (meth)acrylic anhydride with a polyester diol (V) or mixture of diols. Such polyester diols are most readily prepared by condensation of a diol with a dicarboxylic acid, dicarboxylic acid chloride or a carboxylic acid anhydride or condensation of a polyol, such as a diol with a lactone. Suitable polyester diols usually have molecular weights between about 500 and about 20,000, preferably between about 750 and about 10,000, more preferably about 1,000 and about 4,000, and most preferably about 1,000 and about 3,000.

The polyester diol of the formula V may be synthesized by any one of the following reactions: (1) a diacid chloride with a diol; (2) a diacid acid with a diol; (3) an acid anhydride with a diol; and (4) a ring opening reaction of a lactone with a polyfunctional alcohol. Procedures for the synthesis of polyester diols are described in Polymer Synthesis, Vol. 1;S. R. Sandler and W. Karo, Academic Press© 1974 London and in U.S. Pat. No. 5,596,817, which are incorporated herein by reference in their entireties.

In an another embodiment, the polymerizable vinyl containing polyester can be represented by the formula II and the polymerized vinyl containing polyester by the formula VI:

Each R and $R^2$ is independently a $C_6$-$C_{20}$ aromatic residue or a $C_1$-$C_{20}$ aliphatic residue. Each $R^1$ is independently hydrogen or $C_1$-$C_5$ alkyl; "n" is an integer between 2 and 100,000, preferably greater than 5 and most preferably greater than 10; and "j" is an integer in the range of 1 and about 20. Z is a heteroatom, or two hydrogen atoms, preferably oxygen, sulfur, or two hydrogen atoms.

In one preferred embodiment, each R and $R^2$ is independently a $C_6$-$C_{12}$ aromatic or a $C_1$-$C_{12}$ aliphatic residue. Each R and $R^2$ can be the same as those examples of $C_6$-$C_{12}$ aromatic or a $C_1$-$C_{12}$ aliphatic residue disclosed for the polymerizable vinyl containing polyester with the formula I. Each R, $R^1$ and $R^2$ is independently attached to substitutents(s) $(X)_a$, where each X can be the same as those examples disclosed for polymerizable vinyl containing polyester with the formula I. The "a" is an integer in the range of 0 and 20, and each $R^1$ can be H or methyl.

Also, the polymerizable vinyl containing polyester composition involving the polyester having structural formula II also comprise free radical initiators that can be the same as those examples disclosed for polymerizable vinyl containing polyester with the formula I.

In addition, the polymerizable composition involving structural formula II may further comprise a vinyl copolymer selected from the group consisting of styrenic, acrylic, methacrylic, acrylamide, methacrylamide, vinylether, vinyl ester, vinylbenzyl ether, bismaleimide isocyanate monomers and combinations thereof.

In an another embodiment, the polymerizable vinyl containing polyester can be represented by the formula III and the polymerized vinyl containing polyester by the formula VII:

Each R and $R^2$ is independently a $C_6$-$C_{20}$ aromatic residue or a $C_1$-$C_{20}$ aliphatic residue. Each $R^1$ is independently hydrogen or $C_1$-$C_5$ alkyl; and "s" is an integer in the range of 2 and 1000, preferably 5 and 500, and more preferably 10 and 100, "t" is an integer between 1 and 10, preferably between 1 and 5, and most preferably between 1 and 2. Z is a heteroatom, or two hydrogen atoms, preferably oxygen, sulfur or two hydrogen atoms.

In one preferred embodiment, each R and $R^2$ is independently a $C_6$-$C_{12}$ aromatic or a $C_1$-$C_{12}$ aliphatic residue. Each R and $R^2$ can be the same as those examples of $C_6$-$C_{12}$ aromatic or a $C_1$-$C_{12}$ aliphatic residue disclosed for the polymerizable vinyl containing polyester with the formula I. Each R, $R^1$ and $R^2$ is independently attached to substitutents(s) $(X)_a$, where each X can be the same as those examples disclosed for polymerizable vinyl containing polyester with the formula I. The "a" is an integer in the range of 0-20, and each $R^1$ can be H or methyl.

Also, the polymerizable vinyl containing polyester composition involving the polyester having structural formula III also comprise free radical initiators that can be the same as those examples disclosed for polymerizable vinyl containing polyester with the formula I.

In addition, the polymerizable composition involving structural formula III may further comprise a vinyl copolymer selected from the group consisting of styrenic, acrylic, methacrylic, acrylamide, methacrylamide, vinylether, vinylbenzyl ether, bismaleimide isocyanate monomers and combinations thereof.

The polymerizable vinyl group containing polyester compositions in the various embodiments of the invention may be copolymerized with any of a number of vinyl monomers. Suitable vinyl monomers include, but not limited to, styrenics, (meth)acrylates, (meth)acrylamides, vinylethers, vinyl esters, vinylbenzyl ethers, bismaleimides, isocyanates such as those described in U.S. Pat. Nos. 6,627,704, 4,861, 823, 4,116,936, 6,562,181, 5,128,428, 6,803,445, 5,342,554. Such copolymerization can produce polymers with high selectivities at commercially viable fluxes, durability and ease of processability. A comprehensive list of vinyl monomers may be found in U.S. Pat. Nos. 6,627,704 and 5,342,554, which are incorporated herein by reference in their entireties.

The curable resin composition of the present invention is cured, for example, by heating the polymer matrix to provide sufficient crosslink density to limit swelling and enhance selectivity. In order to lower the reaction temperature and promote the crosslinking reaction of unsaturated double bonds, a radical polymerization initiator may be incorporated in the curable composition. For example:

Crosslinked Methacrylate Copolymer wherein "v" and "w" are integers in the range of 1-50.

The amount of the initiator used in the various embodiments of the invention is preferably from about 0.1 to about 10 parts by weight, more preferably from about 0.1 to about 8 parts by weight and, most preferably about 1 to about 2 parts by weight.

Suitable initiators of the radical polymerization are either peroxide initiators, or non-peroxide inititors. Peroxide initiators include organic peroxides and inorganic peroxides. Non-peroxide initiators include azo compounds, carbon-carbon initiators, and UV initiators.

Representative examples of organic peroxide initiators include, but are not limited to, benzoyl peroxide, cumene hydroperoxide, 2,5-dimethyl-hexane-2,5-dihydroperoxide, 2,5-dimethyl-2,5-di(t-butylperoxy)hexyne-3, di-t-butyl peroxide, t-butylcumyl peroxide, $\alpha,\alpha'$-bis(t-butylperoxy-m-isopropyl) benzene, 2,5-dimethyl-2,5-di(t-butylperoxy)hexane, dicumyl peroxide, di-t-butylperoxy isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide and trimethylsilyltriphenylsilyl peroxide and the like, such as those described in U.S. Pat. No. 6,673,892 (the '892 patent), which is incorporated by reference in its entirety. Representatives of inorganic peroxides include, but are not limited to, hydrogen peroxide, potassium peroxydisulfate and the like.

Representative examples of azo compounds include, but are not limited to, 2,2'-azobis(4-methoxy-2,4-dimethylpentanenitrile), 2,3'-azobis(2,4-dimethylpentanenitrile), 2,2'-azobis(isobutyronitrile) and the like. Representative carbon-carbon initiators include, but are not limited to, 2,3-dimethyl-2,3-diphenylbutane, 3,4-dimethyl-3,4-diphenylhexane, Representative UV initiaros include, but are not limited to, benzophenone, 4-phenylbenzophenone, xanthone, thioxanthone, 2-chlorothioxanthone, 4,4'-bis(dimethylamino)benzophenone, benzyl, 9,10-phenanthraquinone, 9,10-anthraquinone, diphenyl(2,4,6-trimethylbenzoyl)phosphine oxide, and the like. Additional examples of UV initiators may be found in the '892 patent.

Figure 1:
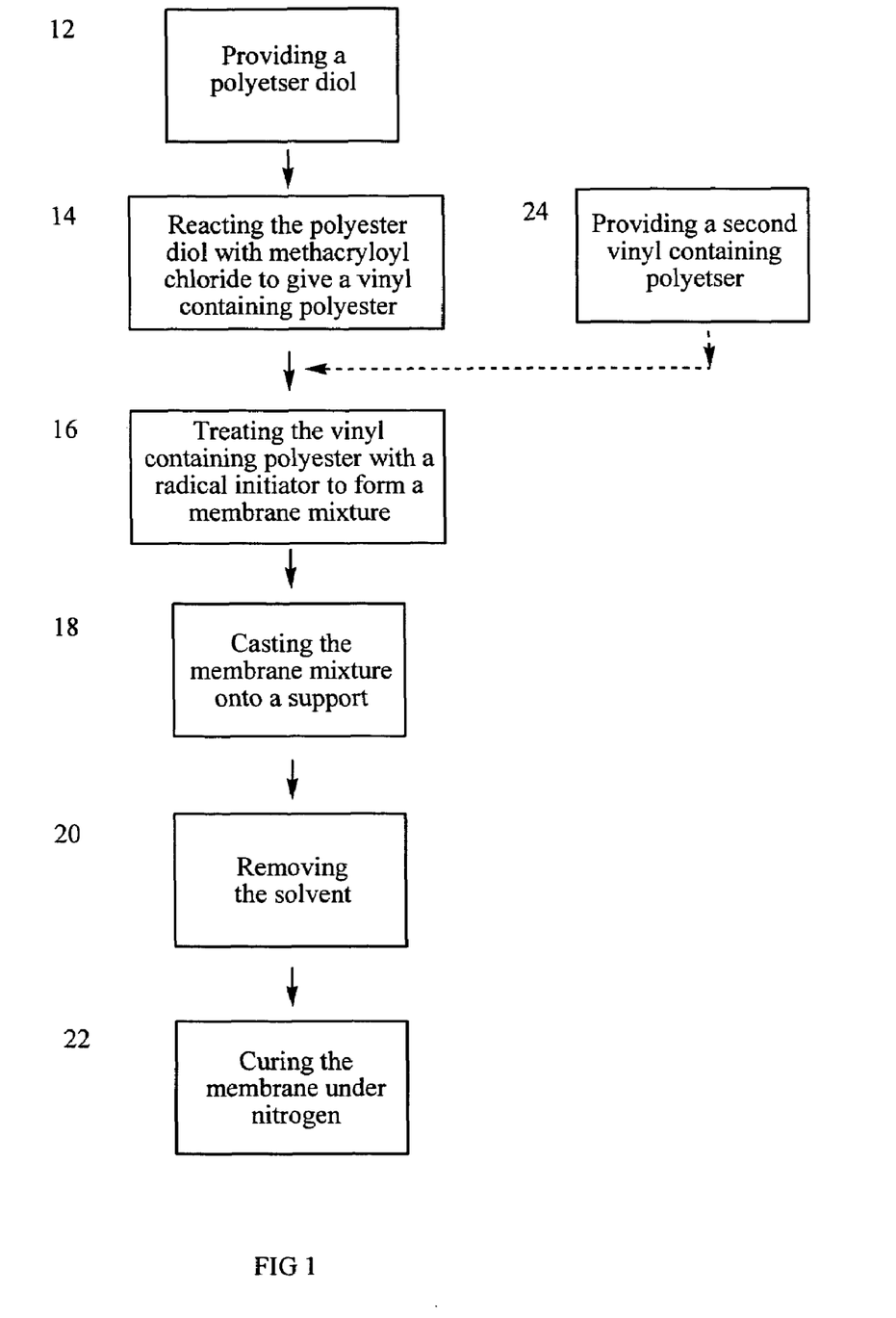
FIG. 1 is a flow chart depicting a method preparing a separation membrane from a polymerizable vinyl containing polyester composition according to the invention, and the optional step of providing a second vinyl containing polyester.

Referring to FIG. 1, the method of making separation membranes with polymerizable vinyl containing polyester composition according to the invention is shown. In step 12, a polyester diol is provided. In step 14, the polyester diol is reacted with methacryloyl chloride to give a vinyl containing polyester. In step 16, the vinyl containing polyester is treated with radical initiator to form a membrane mixture. In step 18, the membrane mixture is cast onto a support. In step 20, the solvent is removed. In step 22, the membrane is cured under nitrogen. Alternatively, in step 24, a second vinyl containing polyester is provided to form the membrane mixture.

EXAMPLES

Synthesis of Polyester (Meth)acrylates

Polyester (meth)acrylates are synthesized as shown in Experimental Examples 1-5 in Table 1. A polyester diol was dissolved in toluene with 1.05 molar equivalents of triethylamine. With vigorous stirring, the solution was treated dropwise, over the period of an hour, with 1.05 equivalents of methacryloyl chloride. The solution was heated to 80° C. for 4 hours. Afterwards, the solution was treated with t-butylcatechol inhibitor, and the solvent removed in a vacuum. Molecular weights were determined at room temperature using a Perkin Elmer Series 200 gel permeation chromatograph with an refractive index detector from polystyrene standards. Thermal decomposition was determined using a TA Instruments TGA2950 in air, with a 10° C./min temperature ramp to 950° C. The glass temperature $T_g$ of each sample was determined using a TA Instruments Q1000 differential scanning calorimeter. After a first run to anneal the sample, the temperature was ramped at 20.00° C./min to 200.00° C. $T_g$ temperature was determined from the second heating ramp. Swelling studies were performed by immersing a polyester sample of known weight in a solvent and measuring the weight uptake. Interaction parameters were determined from the following equation:

$$X=((-V_1 n[v_2^{1/3}-(v_2/2)])-ln(1-v_2)-v_2)/v_2^2$$

X=interaction parameter between a solvent and a polymer
$v_2$=volume fraction of polymer in swollen membrane
$V_1$=molar volume of solvent
n=(density of polymer)r/(molecular weight between) crosslinks

TABLE 1

Synthesis of Polyester Methacrylates

| Component | Experimental Examples | | | | |
|---|---|---|---|---|---|
| | 1 | 2 | 3 | 4 | 5 |
| poly(ethyleneadipate) diol, Mn = 1000 g/mol Bayer Desmophen 2000 | 400 g | — | — | — | — |
| poly(ethyleneadipate) diol, Mn = 1000 g/mol Bayer Desmophen 2500 | — | 200 g | — | — | — |
| poly(ethyleneadipate) diol, Mn = 4700 g/mol Aldrich | — | — | 940 g | — | — |
| poly(butyleneadipate) diol, Mn = 2000 g/mol Bayer Desmophen 2502 | — | — | — | 400 g | — |
| polycaprolactone) diol, Mn = 2000 g/mol Dow/UC Tone 0240 | — | — | — | — | 400 g |
| Triethylamine (g) | 52.6 g | 52.6 g | 52.6 g | 52.6 g | 52.6 g |
| Methylacryloyl Chloride (97% purity) (g) | 54.3 g | 54.3 g | 54.3 g | 54.3 g | 54.3 g |
| Toluene (ml) | 2200 | 1200 | 5300 | 2200 | 2200 |
| t-butyl catechol (g) | 0.50 | 0.25 | 1.2 | 0.50 | 0.50 |
| Reaction Temp, ° C./Time, hr. | 20/4 | 20/4 | 20/4 | 20/4 | 20/4 |
| Yield % | 85 | 90 | 9 | 90 | 92 |

Curing of Polyester (Meth)acrylates

Polyester (meth)acrylates are cured to form polyester poly(meth)acrylates according to the formulation Examples 1-7 as outlined in Table 2.

TABLE 2

Cured Polyester Poly(Meth)acrylate Membranes

| | Formulation Examples: | | | | | | |
|---|---|---|---|---|---|---|---|
| | 1 | 2 | 3 | 4 | 5 | 6 | 7 |
| Component 1 (wt %) | | | | | | | |
| Poly(ethyleneadipate) dimethacrylate, Mn = 2000 g/mol | 98 | 74 | 64 | — | — | — | — |
| Poly(ethyleneadipate) dimethacrylate, Mn = 1000 g/mol | — | — | — | — | — | 98 | — |

TABLE 2-continued

Cured Polyester Poly(Meth)acrylate Membranes

| | Formulation Examples: | | | | | | |
|---|---|---|---|---|---|---|---|
| | 1 | 2 | 3 | 4 | 5 | 6 | 7 |
| Poly(ethyleneadipate) dimethacrylate, Mn = 4700 g/mol | — | — | — | — | — | — | 98 |
| Poly(butyleneadipate) dimethacrylate, Mn = 2000 g/mol | — | — | — | 98 | — | — | — |
| Polycaprolactone dimethacrylate, Mn = 2000 g/mol | — | — | — | — | 98 | — | — |
| DicumylPeroxide, wt % | 2 | 2 | 2 | 2 | 2 | 2 | 2 |
| Cure Temp, ° C./Time, hrs | 130/15 | 130/15 | 130/15 | 130/15 | 130/15 | 130/15 | 130/15 |
| Component 2 (wt %) | | | | | | | |
| Tetrabromobisphenol A ethoxylate diacrylate (1 EO/phenyl) | — | 24 | 34 | — | — | — | — |
| Properties | | | | | | | |
| Swollen Membrane Integrity | good | good | good | good | good | Poor (cracking) | good |
| Decomp. Temp. Onset (° C.) | 389 | 372 | 373 | 379 | 380 | 382 | — |
| % Residue | 1.6 | 4.7 | 6.3 | 0.5 | 0.7 | 1.1 | — |
| Tg (DSC, | −38 | −34 | −33 | −48 | — | −35 | — |
| $\chi_{chloroform}$ | 0.28 | 0.62 | 0.73 | 0.33 | 0.21 | — | 0.43 |
| $\chi_{acetone}$ | 0.68 | 0.86 | 0.97 | 0.65 | 0.61 | 0.79 | 0.65 |
| $\chi_{cyclohexane}$ | 3.31 | 3.58 | 3.47 | 1.94 | 1.57 | 3.72 | 2.66 |
| $\chi_{DMF}$ | 0.52 | 0.75 | 0.88 | 0.57 | 0.56 | 0.64 | 0.58 |
| $\chi_{THF}$ | 0.55 | 0.76 | 0.88 | 0.54 | 0.43 | 0.67 | 0.60 |
| $\chi_{isobutyl\,acetate}$ | 0.86 | 1.06 | 1.13 | 0.68 | 0.53 | 0.96 | 0.82 |
| $\chi_{NMP}$ | 0.40 | 0.69 | 0.82 | 0.50 | 0.42 | 0.55 | 0.52 |
| $\chi_{acetonitrile}$ | 0.68 | 0.89 | 1.02 | 0.71 | 0.72 | 0.81 | 0.68 |
| $\chi_{toluene}$ | 0.64 | 0.91 | 0.97 | 0.56 | 0.39 | 0.82 | 0.73 |
| $\chi_{isooctane}$ | 4.73 | 4.74 | 4.17 | 3.28 | 2.34 | 5.79 | 3.48 |

Synthesis of Poly(ethylene Succinate) Oligomers

A 250-ml three-neck flask was equipped with a condenser, dean-stark receiver, mechanical stirrer, and thermocouple was charged with 130 g of succinic acid (1.1 mol), 75 g of ethylene glycol (1.21 mol) and 0.0455 g of Ti isopropoxide catalyst (0.16 mmol). The mixture was stirred under nitrogen at 180° C. oil bath. The molecular weight was monitored using NMR and/or measuring the water collected in the dean-stark receiver. The molecular weight was monitored using $^1$H NMR by dividing the intensity of the repeat unit at 4.28 ppm by the peak at 3.78-3.80 ppm.

$^1$H NMR: (CDCl$_3$) δ 2.67-2.61 ppm, multiplet, 2H; δ 4.28 ppm, multiplet, 2H; δ 4.19-4.22 ppm, multiplet, end-group; δ 3.78-3.80 ppm, multiplet, end-group Synthesis of Copolymers A three-necked flask equipped with a condenser, dean-stark receiver, nitrogen inlet, mechanical stirrer and thermo-couple was charged with 200 g (0.2 mol) poly(ethylene succinate) (MW=1000 g/mol) (0.40 mol hydroxyl endgroups), 39.2 g of maleic anhydride (0.40 mol) and 0.038 g of toluene sulfonic acid (0.0002 mol). The reactor was placed in an oil bath at 120° C. for 1 hr while stirring. After 1 hr, the temperature was raised to 190° C.-200° C. for 6 hours. The molecular weight was monitored by gel permeation chromatography change in the intensity of the end-groups by $^1$H NMR.

Synthesis of Copolymers of Mixtures of Oligomers

A 250-ml three neck flask equipped with a condenser, dean-stark receiver, nitrogen inlet, mechanical stirrer, thermocouple was charged 50.00 g of poly(ethylene adipate) (0.050 mol), 150.00 g of poly(ethylene succinate) (0.150 mol), 19.62 g of maleic anhydride (0.2 mol), and 0.04 g of toluene sulfonic acid (0.0002 mol). The reactor was placed in an oil bath at 120° C. for 1 hr. After 1 hr, the temperature was raised to 190-200° C. and maintained at that temperature for 6 hours. (GPC Mw=22,540, Mn=6629)

Other copolymers were synthesized by varying the ratio of poly(ethylene adipate) to poly(ethylene succinate) or poly(butylenes adipate). The ranges of each of these copolymers used in the synthesis are shown in Table 3.

PBA=Polybutylene adipate (1000 g/mol)
PES=Polyethylene succinate (1000 g/mol)
PEA=Polyethylene adipate (1000 g/mol)
MA=Maleic Anhydride
PETA=Pentaerythritol Tetraacrylate
BPO=Benzoyl Peroxide

TABLE 3

| | Composition (parts by weight) | | | | | | | Results | |
|---|---|---|---|---|---|---|---|---|---|
| Example | PES | PBA | PEA | MA | PETA | BPO | TS-720 Silica | Thickness (microns) | Normalized Flux (kg/m2/day) | Selectivity |
| 1 | | 10.0 | 90.0 | 9.8 | 10.0 | 5.0 | 4.0 | 10 | 2547.8 | 3.5 |
| 2 | | 10.0 | 90.0 | 9.8 | 10.0 | 5.0 | 4.0 | 20 | 3872.6 | 3.3 |
| 3 | | 5.0 | 95.0 | 9.8 | 10.0 | 5.0 | 4.0 | 10 | 2125.5 | 1.9 |
| 4 | | 15.0 | 85.0 | 9.8 | 10.0 | 5.0 | 4.0 | 35 | 7252.7 | 1.8 |
| 5 | | 10.0 | 90.0 | 9.8 | 10.0 | 5.0 | 3.5 | 35 | 2080.7 | 3.9 |
| 7 | 25.0 | | 75.0 | 9.8 | 10.0 | 5.0 | 3.5 | 35 | 1783.4 | 4.0 |
| 8 | 25.0 | | 75.0 | 9.8 | 10.0 | 5.0 | 3.5 | 35 | 1367.3 | 4.1 |
| 9 | 75.0 | | 25.0 | 9.8 | 10.0 | 5.0 | 3.5 | 25 | 1105.1 | 5.0 |
| 10 | 75.0 | | 25.0 | 9.8 | 10.0 | 5.0 | 3.5 | 25 | 976.6 | 4.8 |
| 11 | 75.0 | | 25.0 | 9.8 | 10.0 | 5.0 | 3.5 | 25 | 679.4 | 4.7 |

Feed: Aromatic/Aliphatic Solvent (wt/wt) is mesitylene/decane 50/50; and
Pervaporation: Temperature/pressure (° C./torr) is 145/1.95.

Terpolymers were synthesized by combining blocks comprising poly(ethylene adipate) and poly(ethylene succinate) or poly(butylenes adipate) and polyethylene succinate as shown in Table 3.

Membrane Preparation

Solution of 3-5 wt % Cabosil TS730 treated fumed silica in DMF was stirred overnight to produce a homogeneous solution. Unsaturated polyester, inhibitor, and crosslinker were added to the solution. An example of a solution would include: 100 parts DMF with polyester oligomer, 10 parts pentaerythritol tetraacrylate, 2 parts benzoylperoxide, 4 parts fumed silica and 150 ppmr t-butyl catachol. The mixture was mechanically stirred then placed in an ultrasound homogenizer for 10-15 minutes. Benzoyl peroxide initiator was added and the mixture placed under vacuum to eliminate air bubbles trapped in the viscous solution.

The mixture was cast onto an exfoliated PTFE support with 0.05 μm pore size (Gore Corporation). The solution was cast to the desired thickness by using a casting knife and controlling the resin content of the solution. The solvent was removed and the resulting membranes were cured under nitrogen in an oven at 120° C. for 3-6 hrs. The membranes were typically between 10-35 μm thick depending on the knife used.

Membrane Characterization

The membranes were tested in a pervaporation membrane testing setup. The membranes were cut into disks with 47 mm diameter and tested for 1-3 hours after reaching equilibrium. The 50/50 mixture of mesitylene and decane feed was kept at 145° C. with stirring. The vacuum on the permeate side was kept at 1.95 torr. These results show the high selectivities and commercially viable fluxes of the polymerizable vinyl containing polyester compositions when used in pervaporation of a 50/50 wt/wt mixture of mesitylene and decane.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A separation membrane for the separation of hydrocarbon mixtures comprising the crosslinked reaction product of a polymerizable vinyl containing polyester having a structure of the formula:

wherein each R and $R^2$ is independently a $C_6$-$C_{20}$ aromatic residue or a $C_1$-$C_{20}$ aliphatic residue,
each $R^1$ is independently hydrogen or $C_1$-$C_5$ alkyl;
"j" is an integer in the range of 2-1000; and
Z is oxygen, sulfur or two hydrogen atoms; with an initiator.

2. The separation membrane of claim 1, wherein each R, $R^1$ and $R^2$ is independently attached to substituent $(X)_a$, wherein each X is independently a member selected from the group consisting of amine, imide, amide, oxime, cyano, isonitrile, nitrate, hydrazide, nitrogen-containing heterocycle, carboxylic acid or corresponding metal salt, ether, formyl, carbonate, carboxylic acid ester, carbinol, phosphorus, phosphate, phosphinate, phosphonate, phosphine oxide, phosphinic acid, phosphonic acid, or corresponding metal salt, sulfone, suolfoxide, thioether, disulfide, sulfinic acid, sulfonic acid or corresponding metal salt, siloxane, fluorine, chlorine, and bromine; and
"a" is an integer in the range of 0-20.

3. The separation membrane of claim 1, wherein
each R and $R^2$ is independently a member selected from the group consisting of 2,2-bis-(4-hydroxyphenyl)propane (or bisphenol-A); bis-(2,4-dihydroxyphenyl)methane; bis-(2-hydroxyphenyl)methane; bis-(4-hydroxyphenyl) methane; bis-(4-hydroxy-5-nitrophenyl)methane; bis-(4-hydroxy-2,6-dimethyl-3-methoxyphenyl)methane; 1,1-bis-(4-hydroxyphenyl)ethane; 1,2-bis-(4-hydroxyphenyl)ethane; 1,1-bis-(4-hydroxy-2-chlorophenyl) ethane; 1,1-bis-(2,5-dimethyl-4-hydroxyphenyl) ethane; 1,3-bis-(3-methyl-4-hydroxyphenyl)propane; 2,2-bis-(3-phenyl-4-hydroxyphenyl)propane; 2,2-bis-(3-isopropyl-4-hydroxyphenyl)propane; 2,2-bis-(4-hydroxyphenyl)propane; 2,2-bis-(4-hydroxyphenyl)pentane; 3,3-bis-(4-hydroxyphenyl)pentane; 2,2-bis-(4-hydroxyphenyl) heptane; bis-(4-hydroxyphenyl)

phenylmethane; bis-(4-hydroxyphenyl)cyclohexymethane; 1,2-bis-(4-hydroxyphenyl)-1,2-bis-(phenyl)propane; 2,2-bis-(4-hydroxyphenyl)-1-phenylpropane, 2,2-bis(2,6-dibromophenoxy-4-hydroxyphenyl)propane, tris(4-hydroxyphenyl)ethane, 2,2-bis-(4-(2-oxy-1-hydroxyethyl)phenyl)propane, 2,2-bis-(2,6-dibromo-4-(2-oxy-1-hydroxyethyl)phenyl)propane, 2,2-bis-(4-(3-oxy-2-hydroxypropyl)phenyl)propane; 2,2-bis-(2,6-dibromo-4-(3-oxy-2-hydroxypropyl)phenyl)propane, 2,2-dimethyl-1,3-propanediol, 1,4-butanediol, 1,1-cyclohexanedimethanol, 1,2-ethandiol, and 2,2,2-tris-(hydroxymethyl)propane; and each $R^1$ is independently hydrogen or methyl.

4. The separation membrane of claim 1, wherein each R and $R^2$ is independently a member selected from the group consisting of isophthalic acid, terephthalic acid, oxalic acid, malonic acid, succinic acid, adipic acid, oxydiglycolic acid, oxydipropionic acid, thiodiglycolic acid, thiodipropionic acid, sulfonyldiglycolic acid, and sulfonyldipropionic acid.

5. The separation membrane of claim 1, wherein the polymerizable vinyl containing polyester has a molecular weight from 500 to 20,000.

6. The separation membrane of claim 1, further comprising a vinyl copolymer, wherein the vinyl copolymer is a member selected from the group consisting of styrenic, acrylic, methacrylic, acrylamide, methacrylamide, vinylether, vinylbenzyl ether, bismaleimide and isocyanate.

7. The separation membrane of claim 1, wherein the initiator is a member selected from the group consisting of benzoyl peroxide, cumene hydroperoxide, 2,5-dimethyl-hexane-2,5-dihydroperoxide, 2,5-dimethyl-2,5-di(t-butylperoxy)hexyne-3, di-t-butyl peroxide, t-butylcumyl peroxide, $\alpha,\alpha'$-bis(t-butylperoxy-m-isopropyl) benzene, 2,5-dimethyl-2,5-di(t-butylperoxy)hexane, dicumyl peroxide, di-t-butylperoxy isophthalate, t-butylperoxy benzoate, 2,2-bis(t-butylperoxy) butane, 2,2-bis (t-butylperoxy)octane, 2,5-dimethyl-2,5-di(benzoylperoxy)hexane, di(trimethylsilyl)peroxide, trimethylsilyltriphenylsilyl peroxide, 2,2'-azobis(4-methoxy-2,4-dimethylpentanenitrile), 2,3'-azobis (2,4-dimethylpentanenitrile), 2,2'-azobis (isobutyronitrile), 2,3-dimethyl-2,3-diphenylbutane, 3,4-dimethyl-3,4-diphenylhexane and diphenyl(2,4,6-trimethylbenzoyl)phosphine oxide.

8. The separation membrane of claim 7, whherein the amount of the initiator is from 0.1 part to 10 parts by weight.

9. The separation membrane of claim 7, wherein the amount of the initiator is from 1 part to 2 parts by weight.

10. A separation membrane for the separation of hydrocarbon mixtures comprising the crosslinked reaction product of a polymerizable vinyl containing polyester comprises a structure of the formula wherein each R and $R^2$ is independently a $C_6$-$C_{20}$ aromatic residue or a $C_1$-$C_{20}$ aliphatic residue, each $R^1$ is independently hydrogen or $C_1$-$C_5$ alkyl;

"s" is an integer in the range of 2-1000;

"t" is an integer between 1 and 10; and

Z is oxygen, sulfur or two hydrogen atoms; with an initiator.

11. The separation membrane of claim 10, wherein each R, $R^1$ and $R^2$ is independently attached to substituents $(X)_a$, wherein each X is independently a member selected from the group consisting of amine, imide, amide, oxime, cyano, isonitrile, nitrate, hydrazide, nitrogen-containing heterocycle, carboxylic acid or corresponding metal salt, ether, formyl, carbonate, carboxylic acid ester, carbinol, phosphorus, phosphate, phosphinate, phosphonate, phosphine oxide, phosphinic acid, phosphonic acid, or corresponding metal salt, sulfone, suolfoxide, thioether, disulfide, sulfinic acid, sulfonic acid or corresponding metal salt, siloxane, fluorine, chlorine, and bromine; and "a" is an integer in the range of 0-20.

12. The separation membrane of claim 10, wherein each R and $R^2$ is independently a member selected from the group consisting of 2,2-bis-(4-hydroxyphenyl)propane (or bisphenol-A); bis-(2,4-dihydroxyphenyl)methane; bis-(2-hydroxyphenyl)methane; bis-(4-hydroxyphenyl)methane; bis-(4-hydroxy-5-nitrophenyl)methane; bis-(4-hydroxy-2,6-dimethyl-3-methoxyphenyl)methane; 1,1-bis-(4-hydroxyphenyl)ethane; 1,2-bis-(4-hydroxyphenyl)ethane; 1,1-bis-(4-hydroxy-2-chlorophenyl)ethane; 1,1-bis-(2,5-dimethyl-4-hydroxyphenyl)ethane; 1,3-bis-(3-methyl-4-hydroxyphenyl)propane; 2,2-bis-(3-phenyl-4-hydroxyphenyl)propane; 2,2-bis-(3-isopropyl-4-hydroxyphenyl)propane; 2,2-bis-(4-hydroxyphenyl)propane; 2,2-bis-(4-hydroxyphenyl)pentane; 3,3-bis-(4-hydroxyphenyl)pentane; 2,2-bis-(4-hydroxyphenyl)heptane; bis-(4-hydroxyphenyl)phenylmethane; bis-(4-hydroxyphenyl)cyclohexymethane; 1,2-bis-(4-hydroxyphenyl)-1,2-bis-(phenyl)propane; 2,2-bis-(4-hydroxyphenyl)-1-phenylpropane, 2,2-bis(2,6-dibromophenoxy-4-hydroxyphenyl)propane, tris(4-hydroxyphenyl)ethane, 2,2-bis-(4-(2-oxy-1-hydroxyethyl)phenyl)propane, 2,2-bis-(2,6-dibromo-4-(2-oxy-1-hydroxyethyl)phenyl)propane, 2,2-bis-(4-(3-oxy-2-hydroxypropyl)phenyl)propane; 2,2-bis-(2,6-dibromo-4-(3-oxy-2-hydroxypropyl)phenyl)propane, 2,2-dimethyl-1,3-propanediol, 1,4-butanediol, 1,1-cyclohexanedimethanol, 1,2-ethandiol, and 2,2,2-tris-(hydroxymethyl)propane; and each $R^1$ is independently hydrogen or methyl.

13. The separation membrane of claim 10, wherein each Rand $R^2$ is independently a member selected from the group consisting of isophthalic acid, terephthalic acid, oxalic acid, malonic acid, succinic acid, adipic acid, oxydiglycolic acid, oxydipropionic acid, thiodiglycolic acid, thiodipropionic acid, sulfonyldiglycolic acid, and sulfonyldipropionic acid.

14. The separation membrane of claim 10, wherein the polymerizable vinyl containing polyester has a molecular weight from 500 to 20,000.

15. The separation membrane of claim 10, further comprising a vinyl copolymer, wherein the vinyl copolymer is a member selected from the group consisting of styrenic, acrylic, methacrylic, acrylamide, methacrylamide, vinylether, vinyl ester, vinylbenzyl ether, bismaleimide and isocyanate.

16. A method of preparing a separation membrane comprising the steps of:

providing a polyester diol, reacting the polyester diol with methacryloyl chloride to form a vinyl containing polyester, treating the vinyl containing polyester with a radical initiator to form a membrane mixture in a solvent, casting the membrane mixture onto a membrane support, removing the solvent from the membrane mixture, and curing the membrane under nitrogen atmosphere.

17. The method according to claim 16, further comprising the step of providing a second vinyl containing polyester before the step of casting the membrane mixture.

* * * * *

UNITED STATES PATENT AND TRADEMARK OFFICE
CERTIFICATE OF CORRECTION

PATENT NO.       : 7,638,053 B2                          Page 1 of 1
APPLICATION NO.  : 11/158851
DATED            : December 29, 2009
INVENTOR(S)      : Yeager et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Ninth Day of November, 2010

David J. Kappos
*Director of the United States Patent and Trademark Office*